United States Patent
Watanabe et al.

(10) Patent No.: US 8,237,891 B2
(45) Date of Patent: Aug. 7, 2012

(54) LIQUID CRYSTAL DISPLAY, AND PROJECTION TYPE DISPLAY USING LIQUID CRYSTAL DISPLAY LAYER

(75) Inventors: Shinya Watanabe, Tokyo (JP); Shouhei Maezawa, Kanagawa (JP); Tomoki Furuya, Kanagawa (JP); Shunji Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 910 days.

(21) Appl. No.: 11/570,946

(22) PCT Filed: Jun. 10, 2005

(86) PCT No.: PCT/JP2005/010706
§ 371 (c)(1),
(2), (4) Date: Oct. 7, 2008

(87) PCT Pub. No.: WO2006/001183
PCT Pub. Date: Jan. 5, 2006

(65) Prior Publication Data
US 2009/0051833 A1   Feb. 26, 2009

(30) Foreign Application Priority Data
Jun. 23, 2004   (JP) ................. P2004-185381

(51) Int. Cl.
*G02F 1/1335* (2006.01)
(52) U.S. Cl. .............................. 349/95; 349/5
(58) Field of Classification Search ........ 349/95
See application file for complete search history.

(56) References Cited

U.S. PATENT DOCUMENTS 6,002,459 A * 12/1999 Kaise et al. ............ 349/95
6,104,458 A *  8/2000 Fukuda ................... 349/95

FOREIGN PATENT DOCUMENTS

| JP | 08-086901   | 4/1996  |
| JP | 08-318060   | 11/1996 |
| JP | 09-127496   | 5/1997  |
| JP | 10-161097   | 6/1998  |
| JP | 11-133372   | 5/1999  |
| JP | 2000-131507 | 5/2000  |
| JP | 2001-174776 | 6/2001  |
| JP | 2002-090882 | 3/2002  |

OTHER PUBLICATIONS

Japanese Office Action dated Apr. 30, 2008 for Application No. 2004-185381.
International Search Report dated Apr. 26, 2006.

* cited by examiner

*Primary Examiner* — Wen-Ying P Chen
(74) *Attorney, Agent, or Firm* — SNR Denton US LLP

(57) ABSTRACT

There is provided a micro lens array (11) in which a plurality of micro lenses (21) is disposed two-dimensionally on a substrate, wherein the focal distance f of the micro lens (21) and distance Ts from the main surface of the micro lens (21) to the substrate surface upon which light is incident meet the following $$X = Ts/\sqrt{2}P, \quad Y = f/\sqrt{2}P$$

where P is a pitch of the micro lenses (21) and (X, Y) is within an X-Y coordinate system surrounded by the following point sets (0.75, 1.00), (0.75, 1.25), (1.00, 1.75), (1.75, 2.50), (2.25, 2.50), (2.25, 2.00), (1.50, 1.25), (1.00, 1.00).

The micro lens array can be used to improve the contrast of a liquid crystal display having an optical compensation element provided therein.

10 Claims, 11 Drawing Sheets

Prior Art

LIQUID CRYSTAL DISPLAY, AND PROJECTION TYPE DISPLAY USING LIQUID CRYSTAL DISPLAY LAYER

TECHNICAL FIELD

The present invention relates to a projection type display such as a projector, rear projection television set or the like, using a liquid crystal panel on which an image is projected for display, and a liquid crystal display and micro lens array used in the projection type display.

This application claims the priority of the Japanese Patent Application No. 2004-185381 filed in the Japanese Patent Office on Jun. 23, 2004, the entirety of which is incorporated by reference herein.

BACKGROUND ART

There have so far been proposed a liquid crystal projector and liquid crystal projection type television set, in which an image on a liquid crystal panel used as an optical switching device is projected onto a screen for display in an enlarged scale through a projection optical system. These apparatuses are thin, lightweight and capable of displaying a sharp image.

A liquid crystal display capable of displaying a sharper projected image has been proposed in the Japanese Patent Laid Open No. 161097 of 1998 (also referred to as "Patent Document 1" herein). FIG. 1 schematically illustrates the liquid crystal display disclosed in the Patent Document 1. The liquid crystal display is generally indicated with a reference numeral 100, and includes dichroic mirrors 112B, 112R and 112G which separate parallel white light $L_1$ incident thereupon from a white light source into blue (B) light, red (R) light and green (G) light, an LCD (liquid crystal display) panel 120 to intensify each of the B light, R light and G light separated by the dichroic mirrors 112B, 112R and 112G, and a projection lens 130 to condense and combine the B light, R light and G light coming from the LCD panel 120 on a screen 140, as shown in FIG. 1.

The dichroic mirrors 112B, 112R and 112G are fixed to form a small angle with each other. They separate the white light L1 into the B light, R light and G light for incidence upon the LCD panel 120 at different angles, respectively.

As shown, the LCD panel 120 includes a pixel substrate 121 having multiple pixel electrodes formed thereon, an opposite substrate 122 having opposite electrodes and micro lenses formed thereon, and a liquid crystal layer 123 provided between the pixel substrate 121 and opposite substrate 122.

FIG. 2 is an illustration, enlarged in scale, of the sectional structure the LCD panel 120 included in the liquid crystal display 100. As shown in FIG. 2, the pixel substrate 121 includes a glass substrate 121a, B-, R- and G-light pixel electrodes 121B, 121R and 121G disposed regularly from bottom to top on one side (input side in the drawing) of the glass substrate 121a, and a black matrix 121b formed on the glass substrate 121a and including TFT etc. (not shown) functioning as a switching device to apply a voltage corresponding to an image signal to each of the pixel electrodes 121B, 121R and 121G. Each TFT has a gate, drain and source (not shown) made of polysilicon, for example. Of these electrodes, the gate is connected to an address wire extending vertically in the drawing, source is connected to a data wire extending perpendicularly to the plane of the drawing and the drain is connected to each of the pixel electrodes 121B, 121R and 121G. By selectively applying an image signal voltage to a pixel electrode selected by the address and data wires, the alignment of liquid crystal molecules in the liquid crystal layer 123 between the pixel electrode and opposite electrode 122d is changed to change the direction of polarization of light passing by the liquid crystal molecules.

On the other hand, the opposite substrate 122 includes a glass substrate 122a, a micro lens array 122b formed on one end portion of the glass substrate 122a, a cover glass 122c disposed close on the micro lens array 122b, and an opposite electrode 122d formed on the cover glass 122c.

The opposite electrode 122d is a transparent electrode formed over, or on a necessary area of, the cover glass 122c and has a fixed potential.

The micro lens array 122b is formed as a graded index lens by the selective ion diffusion method, for example. Each of micro lenses (ML) forming together the micro lens array 122b is usually formed as a semi-cylindrical lens whose axis extends perpendicularly to the plane of the drawing. However, it may be an ordinary spherical lens or a curved lens similar to the spherical lens.

For reference's sake, the micro lens array 122b is formed from micro lenses disposed for the three pixel electrodes 121B, 121R and 121G, respectively, on the pixel substrate 121. B-, R- and G-light beams incident upon the micro lenses from three different directions are condensed for incidence upon the pixel electrodes 121B, 121R and 121G respectively, through the liquid crystal layer 123.

In the liquid crystal display 100 constructed as above, the micro lenses disposed with a pitch corresponding to the TFT pixel pitch are associated in one-to-one relation with the TFT pixels, respectively, so that the light supposed not to pass by the TFT light shield because it is reflected by the latter can be polarized to improve the transmittance.

Normally, the projector should have two performances: a high transmittance and contrast. In the liquid crystal display 100, the micro lens array 122 provided permits to design smaller TFTs which will possibly cause the transmittance to be lower. Thus, the liquid crystal display 100 can implement a high image sharpness, transmittance and smaller design all together.

In this connection, the polarization of light to be projected into the liquid crystal display depends upon the light incidence angle formed in relation to the direction of alignment of liquid crystal molecules filled in the LCD panel. More specifically, straight polarized light obliquely incident into the LCD panel goes out as elliptic polarized light due to the birefringence of the liquid crystal, so that only a part of the light supposed to go out will go out, resulting in a lower contrast. Especially the micro lens array provided in the liquid crystal display will cause incident light to be scattered onto the liquid crystal layer at an increased angle, which will result in an extremely low contrast.

An optical compensation technique to improve the image contrast in the liquid crystal display has been proposed in the Japanese Patent Laid Open No. 2001-174776 (Patent Document 2). The optical compensation technique disclosed in this Patent Document 2 is such that an optical compensation film having such an optical characteristic as to cancel the influence of the birefringence of the LCD panel is provided in the liquid crystal display to inhibit the image contrast from varying depending upon the incidence angle of light, namely, the so-called dependence of the contrast on the angle of visibility. The optical compensation film can compensate the phase difference for light incident at an extreme angle as well, so that the image contrast can be improved by applying this technique to a liquid crystal display having a micro lens array provided therein.

For information's sake, the effect of improvement in angle of visibility by the optical compensation element such as the optical compensation film is disclosed in the "Liquid Crystal—Technique for Increasing Angle of Visibility of TFT-LCD by Discotic Optical Compensation Film—Vol. 16, No. 1".

Since the micro lenses used in the conventional liquid crystal projector are designed to provide optimum conditions for the transmittance, a combination of the micro lenses and optical compensation elements cannot assure any optimum contrast as the case may be. A design value for a micro lens which assures a high transmittance is disclosed in the Japanese Patent Laid Open No. 86901 of 1996 (Patent Document 3), for example. In the disclosed technique, however, major consideration is given to the transmittance.

DISCLOSURE OF THE INVENTION

It is therefore desirable to overcome the above-mentioned drawbacks of the related art by providing a micro lens array capable of improving the contrast at the maximum in case optical compensation elements are provided, a liquid crystal display and projection type display, in which the optical compensation elements are provided.

According an embodiment of the present invention, there is provided a micro lens array in which a plurality of micro lenses is disposed two-dimensionally on a substrate, wherein the focal distance f of the micro lens and distance Ts from the main surface of the micro lens to the substrate surface upon which light is incident meet the following $$X = Ts/\sqrt{2}P$$

$$Y = f/\sqrt{2}P$$

In the above micro lens array, the micro lenses are disposed with a pitch P and (X, Y) is within an X-Y coordinate system surrounded by the following point sets
(0.75, 1.00), (0.75, 1.25), (1.00, 1.75), (1.75, 2.50), (2.25, 2.50), (2.25, 2.00), (1.50, 1.25), (1.00, 1.00).

Also, according to another embodiment of the present invention, there is provided a liquid crystal display including:

a pixel substrate having formed thereon pixel electrodes to which a signal voltage corresponding to image data is applied;

an opposite substance having opposite electrodes disposed opposite to the pixel electrodes with a liquid crystal layer laid between the opposite and pixel electrodes; and a micro lens array in which a plurality of micro lenses is disposed two-dimensionally on the opposite substrate;

the focal distance f of the micro lens and distance Ts from the main surface of the micro lens to the substrate surface upon which light is incident meeting the following $$X = Ts/\sqrt{2}P$$

$$Y = f/\sqrt{2}P$$

In the above liquid crystal display, the micro lenses are disposed with a pitch P and (X, Y) is within an X-Y coordinate system surrounded by the following point sets
(0.75, 1.00), (0.75, 1.25), (1.00, 1.75), (1.75, 2.50), (2.25, 2.50), (2.25, 2.00), (1.50, 1.25), (1.00, 1.00).

Also, according to another embodiment of the present invention, there is provided a projection type display including:

a light source;

a lighting optical system to focus a light beam emitted from the light source onto a predetermined light path;

a liquid crystal panel to make optical modulation of the light beam focused by the lighting optical system; and a projection lens to project, in a larger scale, the light beam subjected to the optical modulation by liquid crystal elements;

the lighting optical system including a micro lens array in which a plurality of micro lenses is disposed two-dimensionally on a substrate, and the focal distance f of the micro lens and distance Ts from the main surface of the micro lens to the substrate surface upon which light is incident meeting the following $$X = Ts/\sqrt{2}P$$

$$Y = f/\sqrt{2}P$$

In the above projection type display, the micro lenses are disposed with a pitch P and (X, Y) is within an X-Y coordinate system surrounded by the following point sets
(0.75, 1.00), (0.75, 1.25), (1.00, 1.75), (1.75, 2.50), (2.25, 2.50), (2.25, 2.00), (1.50, 1.25), (1.00, 1.00).

According to the present invention, the focal distance f of the micro lens and a cover layer thickness Ts meet the following $$X = Ts/\sqrt{2}P$$

$$Y = f/\sqrt{2}P$$

According to the present invention, the micro lenses are disposed with a pitch P and (X, Y) is within an X-Y coordinate system surrounded by the following point sets
(0.75, 1.00), (0.75, 1.25), (1.00, 1.75), (1.75, 2.50), (2.25, 2.50), (2.25, 2.00), (1.50, 1.25), (1.00, 1.00).

According to the present invention, light incident upon a domain can be reduced. Thus, it is possible to keep an image contrast from being reduced due to transmission of the light through the domain.

The foregoing and other features, aspects and advantages of the present invention will be come apparent from the following detailed description of embodiments of the present invention when taken in conjunction with the accompanying drawings.

BEST MODE FOR CARRYING OUT THE INVENTION

The present invention will be described in detail below concerning an embodiment thereof with reference to the accompanying drawings. The embodiment is an application of the present invention to a three-panel liquid crystal projector which projects a full-color image with the use of three transmissive liquid crystal panels for red (R) light, blue (B) light and green (G) light, respectively.

Figure 1:
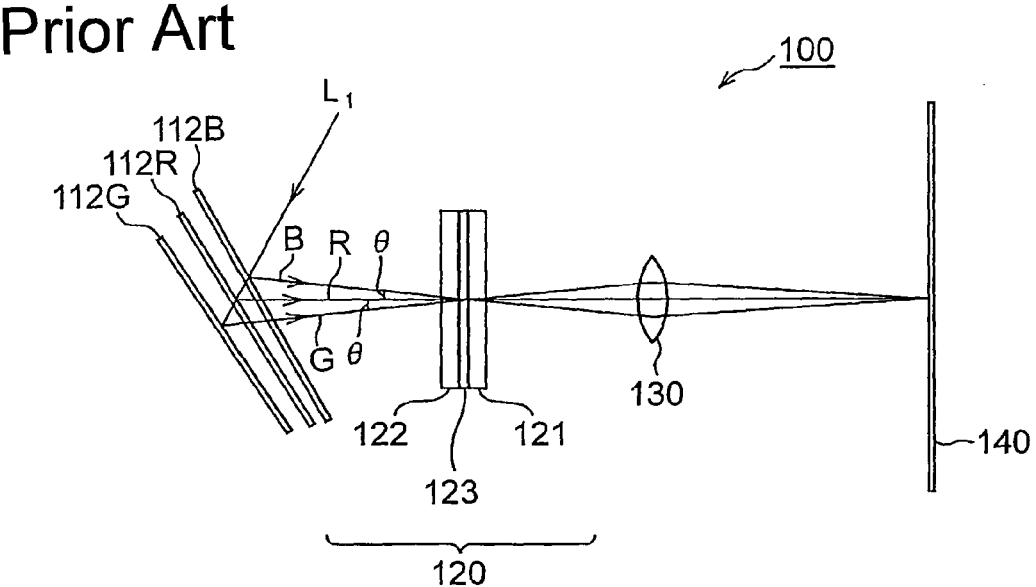
FIG. 1 is a side elevation of the conventional liquid crystal display proposed to sharpen an image projected from a projector.
Figure 2:
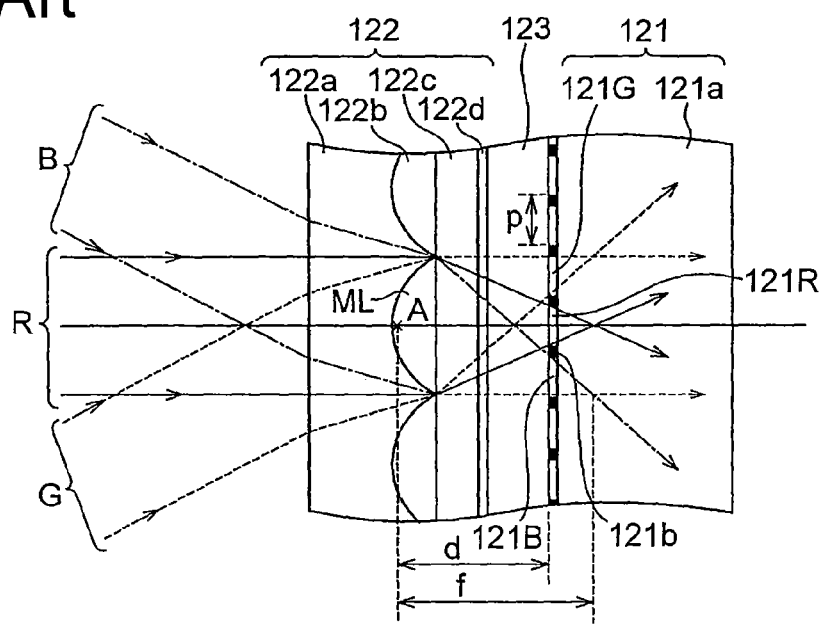
FIG. 2 is a sectional view, enlarged in scale, of the sectional structure of the LCD panel used in the conventional liquid crystal display.
Figure 3:
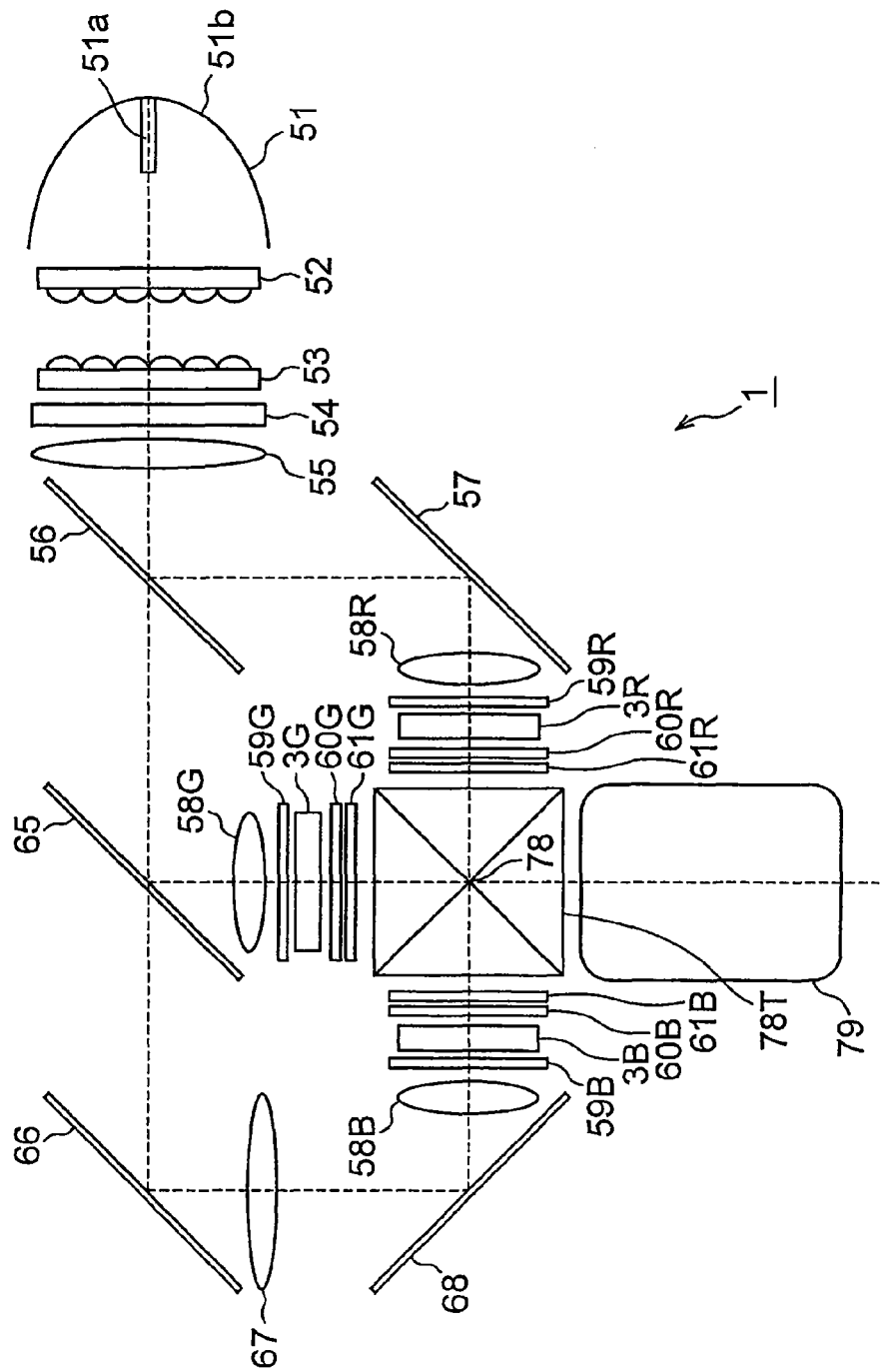
FIG. 3 is a side elevation of a liquid crystal projector as an embodiment of the present invention.

The liquid crystal projector, generally indicated with a reference numeral 1, is to project an image onto an external screen. As shown in FIG. 3, it includes a light source 51 to emit light, first and second micro lens arrays 52 and 53 in each of which a plurality of lens cells each having a contour generally equal in figure to the aspect ratio of an effective opening area of a liquid crystal layer is disposed tetragonally, for example, along a traveling path of the light emitted from the light source 51, a PS synthetic resin 54 to polarize the light from the second micro lens array 53 in a predetermined direction, a condenser lens 55 to condense the light having passed through the PS synthetic resin 54, and a first dichroic mirror 56 to separate the light correspondingly to a wavelength.

The light source 51 can emit white light including red, blue and green (three primary colors) components necessary for projecting a full-color image. The light source 51 includes a white light emitter 51a and a reflector 51b to reflect the light emitted from the light emitter 51a. The light emitter 51a of the light source 51 is a discharge lamp having a gas containing a mercury component, for example, an extra-high pressure mercury lamp or the like. The reflector 51b of the light source 51 is a concave mirror having a mirror surface shaped for a high coefficient of light condensation. Also, the reflector 51b is shaped to have a rotation-symmetrical surface such as a rotational paraboloid or rotational ellipsoid, for example.

The first micro lens array 52 has a shape equal in area to the effective area of the liquid crystal layer to illuminate, uniformly along with the second micro lens array 53, the effective area of the liquid crystal layer which will be described in detail later, whereby the light intensity is distributed uniformly. The first micro lens array 52 has a structure in which a plurality of small lens elements is arranged in an array. Each small lens element of the first micro lens array 52 condenses the light emitted from the light source 51 to produce a small point source, while the second micro lens array 53 combines illumination light from the point sources.

The condenser lens 55 is a convex lens to adjust the diameter of light spot for projecting the light controlled by the PS synthetic resin 54 in a predetermined direction of polarization onto the opening area of the liquid crystal layer with a higher efficiency.

The first dichroic mirror 56 is made by forming multiple dielectric films on the main surface of a glass substrate or the like. Namely, it is a wavelength selecting mirror having a so-called dichroic coating coated thereon.

The first dichroic mirror 56 is disposed vertically at an angle of 45 deg. in relation to the path of the light incident upon the condenser lens 55 to allow blue and green components of the light incident from the condenser lens 55 to pass by while changing the direction of red component by 90 deg. by reflecting it nearly vertically.

The liquid crystal protector 1 includes, along the traveling path of the red light separated by the first dichroic mirror 56, a turn-back mirror 57 to make total reflection of the light, a first field lens 58R to condense the light, a first incident-side polarizing plate 59R to allow only a light component polarized in a predetermined direction to pass by, a liquid crystal display 3R to modulate the light spatially, an optical compensation element 60R to compensate the phase of the light coming from the liquid crystal display 3R, and a first outgoing-side polarizing plate 61R to allow only a light component polarized in a predetermined direction to pass by.

The turn-back mirror 57 is a total-reflection mirror to change the direction of light by 90 deg. by reflecting the light reflected by the first dichroic mirror 56 vertically. It is disposed vertically at an angle of 45 deg. in relation to the light path of the reflected red light. Thus, the turn-back mirror 57 can reflect the red light toward the first field lens 58R.

The first field lens 58R is a condenser lens to form together with the condenser lens 55 a lighting optical system. It outputs the red light reflected by the turn-back mirror 57 to the first incident-side polarizing plate 59R while condensing the light onto the liquid crystal display 3R.

The first incident-side polarizing plate 59R is to allow only a component, polarized in a predetermined direction, of the red light coming from the first field lens 58R to pass by. The first incident-side polarizing plate 59R is disposed in the same direction as the aligned direction of the liquid crystal molecules at the incident-side substrate side of the liquid crystal display 3R.

The liquid crystal display 3R is a transmissive panel using the liquid crystal molecules. It is filled with the liquid crystal molecules between two transparent substrates (not shown). The liquid crystal display 3R constructed as above spatially modulates the red light incident through the first incident-side polarizing plate 59R and allows it to pass by changing the state of the liquid crystal molecules correspondingly to an image signal supplied correspondingly to red-image information. The liquid crystal display 3R has an incidence surface formed generally rectangular correspondingly to a generally rectangular shape of a projected image whose width is larger than the height.

The optical compensation element 60R has an optical characteristic to cancel the influence of the birefringence of the liquid crystal display 3R. This optical compensation element 60R can inhibit the contrast of an image from varying depending upon the incidence angle of light, namely, to inhibit the so-called dependence of the contrast on the visibility angle.

The first outgoing-side polarizing plate 61R allows only a component, directed in a direction perpendicular to the first incident-side polarizing plate 59R, of the red light modulated by the liquid crystal display 3R, to pass by. The first outgoing-side polarizing plate 61R is disposed in the same direction as the aligned direction of the liquid crystal molecules on the outgoing-side substrate surface of the liquid crystal display 3R. More specifically, the first outgoing-side polarizing plate 61R is disposed to have the light transmission axis thereof perpendicular to that of the first incident-side polarizing plate 59R, namely, to have a so-called crossed nicols relation with the first incident-side polarizing plate 59R.

The liquid crystal projector 1 further includes a second dichroic mirror 65 to separate the incident light along the paths of the light of other colors separated by the first dichroic mirror 56, that is, the blue light and green light, correspondingly to the waveband.

The second dichroic mirror 65 separates the incident light into blue light, and light of other colors, that is, green light.

The second dichroic mirror 65 is disposed vertically at an angle of 45 deg. in relation to the path of the light incident from the first dichroic mirror 56 to allow the blue component of the light incident from the first dichroic mirror 56 to pass by while changing the direction of the green component by 90 deg.

The liquid crystal protector 1 further includes, along the traveling path of the green light separated by the second dichroic mirror 65, a second field lens 58G to condense the light, a second incident-side polarizing plate 59G to allow only a light component polarized in a predetermined direction to pass by, a liquid crystal display 3G to modulate the light spatially, an optical compensation element 60G to compensate the phase of the light coming from the liquid crystal display 3G, and a second outgoing-side polarizing plate 61G to allow only a light component polarized in a predetermined direction to pass by.

The second field lens 58G is a condenser lens to form together with the condenser lens 55 a lighting optical system. It outputs the green light reflected by the second dichroic mirror 65 to the second incident-side polarizing plate 59G while condensing the light onto the liquid crystal display 3G.

The second incident-side polarizing plate 59G is to allow only a component, polarized in a predetermined direction, of the green light coming from the second field lens 58G to pass by. The second incident-side polarizing plate 59G is disposed in the same direction as the aligned direction of the liquid crystal molecules at the incident-side substrate side of the liquid crystal display 3G.

The liquid crystal display 3G is a transmissive panel using the liquid crystal molecules. It is filled with the liquid crystal molecules between two transparent substrates (not shown). The liquid crystal display 3G constructed as above spatially modulates the green light incident through the first incident-side polarizing plate 59G and allows it to pass by changing the state of the liquid crystal molecules correspondingly to an image signal supplied correspondingly to green-image information. The liquid crystal display 3G has an incidence surface formed generally rectangular correspondingly to a generally rectangular shape of a projected image whose width is larger than the height.

The optical compensation element 60G has an optical characteristic to cancel the influence of the birefringence of the liquid crystal display 3G. This optical compensation element 60G can inhibit the contrast of an image from varying depending upon the incidence angle of light, namely, to inhibit the so-called dependence of the contrast on the visibility angle.

The second outgoing-side polarizing plate 61G allows only a component, directed in a direction perpendicular to the second incident-side polarizing plate 59G, of the green light modulated by the liquid crystal display 3G, to pass by. The second outgoing-side polarizing plate 61G is disposed in the same direction as the aligned direction of the liquid crystal molecules on the outgoing-side substrate surface of the liquid crystal display 3G. More specifically, the second outgoing-side polarizing plate 61G is disposed to have the light transmission axis thereof perpendicular to that of the second incident-side polarizing plate 59G, namely, to have a so-called crossed nicols relation with the second incident-side polarizing plate 59G.

The liquid crystal protector 1 further includes, along the traveling path of the blue light separated by the second dichroic mirror 65, a turn-back mirror 66 to make total reflection of the incident light, a relay lens 67 to correct the light path length, a turn-back mirror 68 to make total reflection of the incident light, a third field lens 58B to condense the light, a third incident-side polarizing plate 59B to allow only a light component of the incident light, polarized in a predetermined direction, to pass by, a liquid crystal display 3B to modulate the incident light spatially, an optical compensation element 60B to compensate the phase of the light coming from the liquid crystal display 3B, and a third outgoing-side polarizing plate 61B to allow only a light component of the incident light, polarized in a predetermined direction, to pass by.

The turn-back mirror 66 is a total-reflection mirror to change the direction of light by 90 deg. by reflecting the blue light reflected by the second dichroic mirror 65 vertically. It is disposed vertically at an angle of 45 deg. in relation to the light path of the reflected blue light from the dichroic mirror 65. Thus, the turn-back mirror 66 can reflect the blue light from the second dichroic mirror 65 toward the relay lens 67.

The relay lens 67 is to adjust the light path length in conjunction with the condenser lens 55 in order to guide the blue light reflected by the turn-back mirror 66 to the turn-back mirror 68.

Note that since the light path up to the blue-light liquid crystal display 3B is longer than those up to the red-light liquid crystal display 3R and green-light liquid crystal display 3G, respectively, the relay lens 67 adjust the length of the light path up to the blue-light liquid crystal display 3B in order to correctly guide the blue light for focusing on the liquid crystal display 3B.

The turn-back mirror 68 is a total-reflection mirror to change the traveling direction of the light from the relay lens 67 by 90 deg. by reflecting the light vertically. It is disposed vertically at an angle of 45 deg. in relation to the path of the blue light from the relay lens 67. Thus, the turn-back mirror 68 reflects the blue light from the relay lens 67 toward the third field lens 58B.

The third field lens 58B is a condenser lens to form together with the condenser lens 55 a lighting optical system. It outputs the blue light reflected by the turn-back mirror 68 to the third incident-side polarizing plate 59B while condensing the light onto the liquid crystal display 3B.

The third incident-side polarizing plate 59B is to allow only a component, polarized in a predetermined direction, of the blue light coming from the third field lens 58B to pass by. The third incident-side polarizing plate 59B is disposed in the same direction as the aligned direction of the liquid crystal molecules at the incident-side substrate side of the liquid crystal display 3B.

The liquid crystal display 3B is a transmissive panel using the liquid crystal molecules. It is filled with the liquid crystal molecules between two transparent substrates (not shown). The liquid crystal display 3B constructed as above spatially modulates the blue light incident through the third incident-side polarizing plate 59B and allows it to pass by changing the state of the liquid crystal molecules correspondingly to an image signal supplied correspondingly to blue-image information. The liquid crystal display 3B has an incidence surface formed generally rectangular correspondingly to a generally rectangular shape of a projected image whose width is larger than the height.

The optical compensation element 60B has an optical characteristic to cancel the influence of the birefringence of the liquid crystal display 3B. This optical compensation element 60B can inhibit the contrast of an image from varying depending upon the incidence angle of light, namely, to inhibit the so-called dependence of the contrast on the visibility angle.

The third outgoing-side polarizing plate 61B allows only a component, directed in a direction perpendicular to the third incident-side polarizing plate 59B, of the red light modulated by the liquid crystal display 3B, to pass by. The third outgoing-side polarizing plate 61B is disposed in the same direction as the aligned direction of the liquid crystal molecules on the outgoing-side substrate surface of the liquid crystal display 3B. More specifically, the third outgoing-side polarizing plate 61B is disposed to have the light transmission axis thereof perpendicular to that of the third incident-side polarizing plate 59B, namely, to have a so-called crossed nicols relation with the third incident-side polarizing plate 59B.

The liquid crystal projector 1 further includes a light combining prism 78 provided in a position where the traveling paths of the red light, green light and blue light having been modulated spatially by the liquid crystal displays 3R, 3G and 3B, respectively, and passed by the outgoing-side polarizing plates 61R, 61G and 61B, respectively, intersect each other and which combines these red light, green light and blue light, and a projection lens 79 to project the light thus combined by the light combining prism 78 toward the screen.

The red light having gone out of the liquid crystal display 3R and passed by the first outgoing-side polarizing plate 61R, the green light having gone out of the liquid crystal display 3G and passed by the first outgoing-side polarizing plate 61G and the blue light having gone out of the liquid crystal display 3B and passed by the first outgoing-side polarizing plate 61B are incident upon the light combining prism 78. The light combining prism 78 combines the incident red light, green light and blue light and outputs the combined light from an output surface 78T.

The projection lens 79 projects, in an enlarged scale, the combined light coming from the output surface 78T of the light combining prism 78 to the screen.

Note that in the above-mentioned embodiment, the optical compensation element 60 is disposed between the liquid crystal display 3 and outgoing-side polarizing plate 61, by way of example, because an optical element such as a lens or the like, if any, provided between the liquid crystal display 3 and optical compensation element 60 will restrict the optical compensation by the optical compensation element 60 of light having passed by the liquid crystal display 3.

The liquid crystal projector 1 constructed as above functions as will be described below:

Light emitted from the light source 51 is guided to the first and second micro lens arrays 52 and 53 where its intensity will be uniformly distributed and its direction of polarization be controlled by the PS synthetic resin 54, and then is guided to the condenser lens 55. The light is condensed by the condenser lens 55, its red component is reflected by the first dichroic mirror 56 and guided to the turn-back mirror 57. The light of other colors, that is, green and blue components, are allowed to pass by the first dichroic mirror 56 and are guided to the second dichroic mirror 65.

The red light guided to the turn-back mirror 57 will have the traveling direction thereof turned by 90 deg., and be guided to the first incident-side polarizing plate 59R which allows only a component of the red light, polarized in a predetermined direction, to pass by, and the red light having passed by the first incident-side polarizing plate 59R will be guided to the liquid crystal display 3R. The red light thus guided to the liquid crystal display 3R will be condensed to each pixel by a micro lens array, which will be described in detail later, in the liquid crystal display 3R, and be modulated spatially on the basis of an image signal corresponding to red-color image information. Further, it will further be subjected to phase correction by the optical compensation element 60R, and only a component thereof polarized in a direction perpendicular to the first incident-side polarizing plate 59R will pass by the first outgoing-side polarizing plate 61R and be incident upon the light combining prism 78.

On the other hand, the green light and blue light guided to the second dichroic mirror 65 are reflected by the second dichroic mirror 65 and guided to the second field lens 58G, while the blue light guided to the second dichroic mirror 65 will pass by the latter and be guided to the turn-back mirror 66.

The green light guided to the first incident-side polarizing plate 59G which allows only a component of the green light, polarized in a predetermined direction, to pass by, and the green light having passed by the first incident-side polarizing plate 59G will be guided to the liquid crystal display 3G. The green light thus guided to the liquid crystal display 3G will be condensed to each pixel by a micro lens array, which will be described in detail later, in the liquid crystal display 3G, and be modulated spatially on the basis of an image signal corresponding to green-color image information. Further, it will further be subjected to phase correction by the optical compensation element 60G, and only a component thereof polarized in a direction perpendicular to the first incident-side polarizing plate 59G will pass by the first outgoing-side polarizing plate 61B and be incident upon the light combining prism 78.

On the other hand, the blue light guided to the turn-back mirror 66 will be reflected by the latter and thus guided to the relay lens 67 which will further guide it to the turn-back mirror 68. It will be reflected by the turn-back mirror 68 and thus be guided to the third field lens 58B. Only a component, polarized in a predetermined direction, of the blue light guided to the third field lens 58B will pass by the third incident-side polarizing plate 59B and be guided to the liquid crystal display 3B. The blue light thus guided to the liquid crystal display 3B will be condensed to each pixel by a micro lens array, which will be described in detail later, in the liquid crystal display 3B, and be modulated spatially on the basis of an image signal corresponding to blue-color image information. Only a component thereof polarized in a direction perpendicular to the third incident-side polarizing plate 59B will pass by the third outgoing-side polarizing plate 61B and be incident upon the light combining prism 78.

The incident red light, green light and blue light from the respective surfaces of the light combining prism 78 are combined together by the latter, and the combined light travels from the output surface of the 78T toward the projection lens 79 and is projected, in an enlarged scale, by the projection lens 79 onto the screen.

The aforementioned liquid crystal display 3 will be explained in further detail below with reference to FIG. 4.

Figure 4:
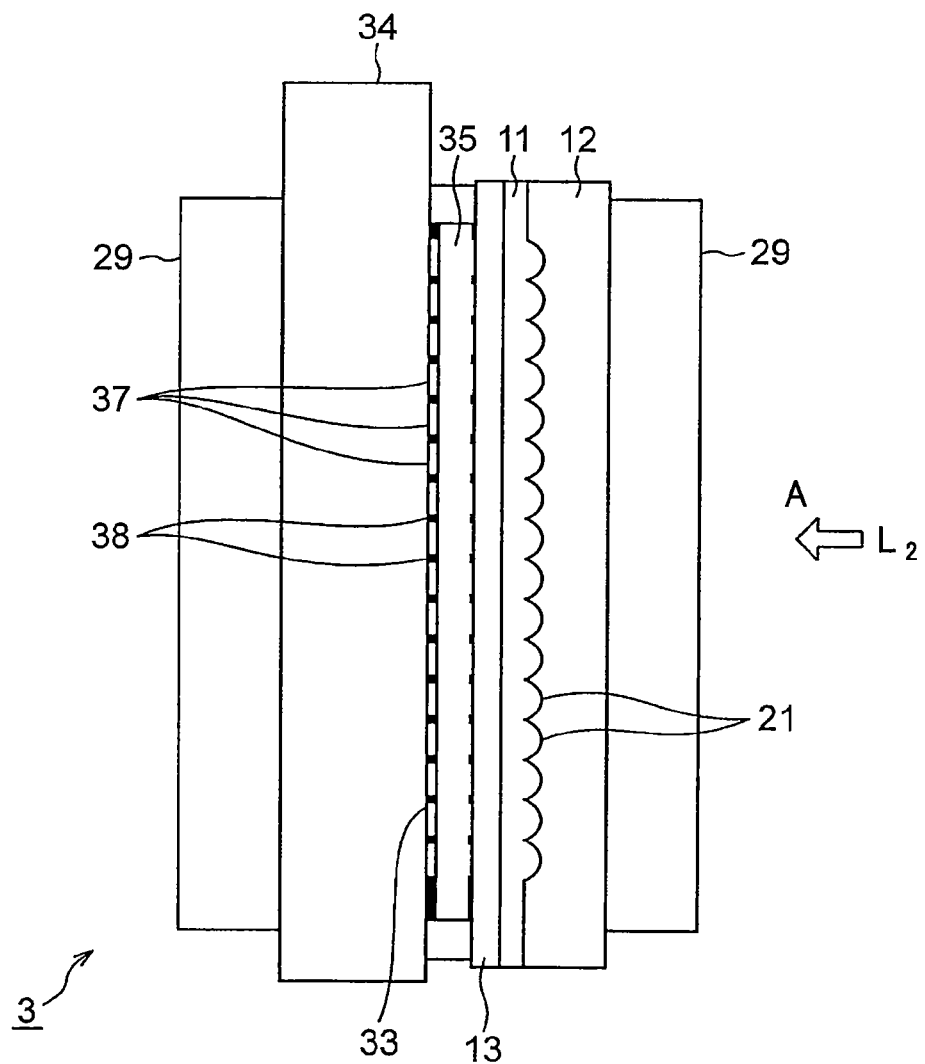
FIG. 4 is a side elevation of a liquid crystal display used in the liquid crystal projector as the embodiment of the present invention.

The liquid crystal display 3 includes a glass substrate 12 upon which light $L_2$ is incident in the direction of arrow A in FIG. 4 from the incident-side polarizing plate 59, a micro lens array 11 formed from a plurality of micro lenses 21 disposed two-dimensionally on the glass substrate 12, a cover glass 13 covering the condensing side of the micro lens array 11, a pixel substrate 34 having multiple pixel electrodes formed thereon, and a liquid crystal layer 35 laid between the pixel substrate 34 and cover glass 13. It further includes antidust glasses 29 covering the input side of the glass substrate 12 and condensing side of the pixel substrate 34, respectively.

On the input side of the pixel substrate 34, there are formed blue (B) light, red (R) light and green (G) light pixel electrodes 37 disposed regularly from bottom to top, and a black matrix 38 formed from TFTs or the like (not shown) working as switching elements to apply a voltage corresponding to an image signal to each of these pixel electrodes. Each of TFTs has a gate, drain and source (not shown) formed from, for example, polysilicon or amorphous silicon. The gate is connected to an address wire extending vertically in FIG. 4, source is connected to a data wire extending perpendicularly to the plane of FIG. 4 and the drain is connected to each of the pixel electrodes 37. When an image signal voltage is selectively applied to a pixel electrode selected by the address and data wires, the alignment of liquid crystal molecules in the liquid crystal layer 35 between the pixel electrode 37 and glass substrate 12 can be changed to change the direction of polarization of light passing by the liquid crystal molecules. For information, the pixel substrate 34 may be attached to a flexible wiring board (not shown) for easier application of the image signal voltage.

Figure 5:
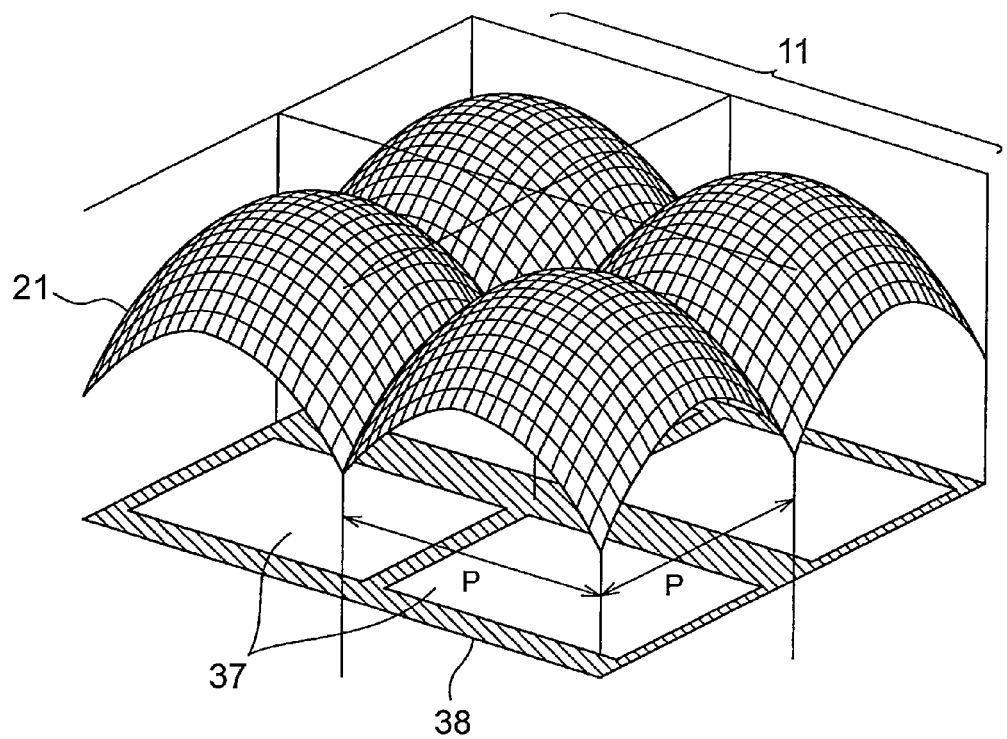
FIG. 5 is a perspective view showing the relation between each pixel element and pitch P of the micro lenses.

As shown in FIG. 5, each pixel electrode 37 is formed from pixels equal in size to the pitch P of the micro lenses 21. Namely, by disposing each micro lens 21 for one pixel of each pixel electrode, it is possible to polarize light supposed not to pass the black matrix 38 because it is reflected by the latter, so that the transmittance can be improved.

The liquid crystal layer 35 is a transmissive panel having liquid crystal molecules filled between substrates (not shown). The liquid crystal layer 35 changes the state of the liquid crystal molecules correspondingly to an image signal supplied from outside correspondingly to image information to be displayed, while spatially modulating light condensed by the micro lenses 21 for passing by the liquid crystal layer 35. The light having passed by the liquid crystal layer 35 will pass by the pixel substrate 34 and antidust glass 29 and go to outside.

The micro lens array 11 is formed as a graded index lens by the selective ion diffusion method, for example. Each of micro lenses 21 forming together the micro lens array 11 is usually formed as a semi-cylindrical lens whose axis extends perpendicularly to the plane of the drawing but may be an ordinary spherical lens, curved lens or aspheric lens.

The portion of the liquid crystal display 3, including from the glass substrate 12 having the micro lens array 11 formed thereon to the cover glass 13, may be formed as shown in FIGS. 6A, 6B, 6C and 6D.

Figure 6D:
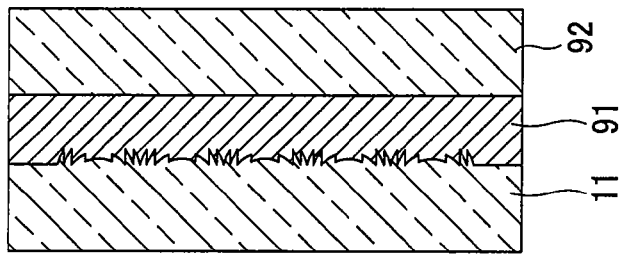
FIGS. 6A, 6B, 6C and 6D are sectional views of a system extending from a glass substrate having a micro lens array formed thereon to a cover glass.
Figure 6C:
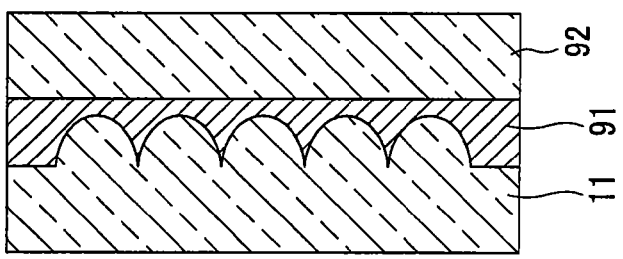
Figure 6B:
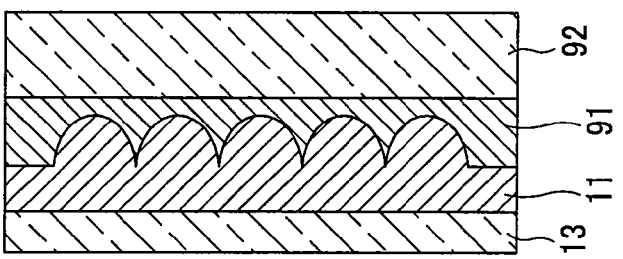
Figure 6A:
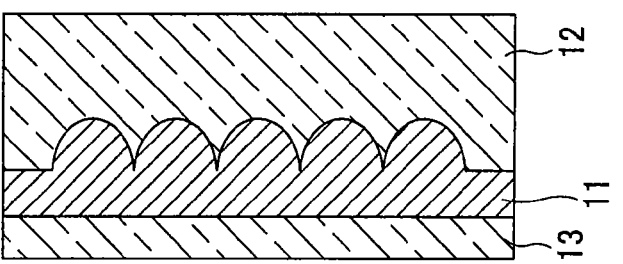

That is, the glass substrate 12 and glass cover 13 may be made of glass, and the micro lens array 11 may be made of a resin, as shown in FIG. 6A. Also, the cover glass 13 may be made of glass, micro lens array 11 be made of a resin, and the glass substrate 12 may be replaced with a resin layer 91 and glass layer 92 as shown in FIG. 6B. Also, an integration of the cover glass 13 and micro lens array 11 may be formed from glass, and the glass substrate 12 may be replaced with the resin layer 91 and glass layer 92, as shown in FIG. 6C. Also, the micro lens array 11 may be formed from a so-called Fresnel lens, graded index lens (grin lens) or the like, and the glass substrate 12 may be replaced with the resin layer 91 and glass layer 92, as shown in FIG. 6D.

Note that a light-shielding film of aluminum (Al) or chrome (Cr) is formed on the surface of the cover glass 13, which is in contact with the liquid crystal layer 35, as the case may be. A transparent thin conductive film may be formed on the light-shielding film (not shown).

The antidust glass 29 defocuses dust on the surface of the liquid crystal display 3. The antidust glass 29 is made of a material whose light transmittance is high, such as quartz, and coated with AR at the surface thereof being in contact with air.

Next, factors upon which the contrast of an image formed on the liquid crystal display 3 constructed as above depends will be explained.

The first one of such factors is the visibility angle of the liquid crystal. The polarization of light depends upon the incident angle of the light in relation to the alignment of the liquid crystal molecules filled in the liquid crystal layer 35. Since ideally the liquid crystal molecules are disaligned when applied with a voltage while being held between substrates (not shown), light incident upon the liquid crystal layer 35 will pass by the liquid crystal molecules in the optical-axial direction and be linearly polarized before going out of the liquid crystal molecules. When light having an extreme angle is incident obliquely upon the liquid crystal layer 35, however, since it is elliptically polarized due to the birefringence of the liquid crystal, there will be outputted only a part of the light supposed to be outputted, resulting in a lower image contrast.

The second factor is a so-called light leakage through domain. The transmissive liquid crystal display 3 as shown in FIG. 4 is driven mainly by a so-called "1H inversion drive method". The 1H inversion drive is such that pixels are written every other array from bottom to top on the incident-side surface of the pixel substrate 34. Since voltages opposite in polarity to each other are applied to pixels vertically adjacent to each other on the pixel electrode 37, an electric field will occur between such adjacent pixels, so that the liquid crystal molecules around the electric field will be misaligned. The misaligned liquid crystal molecules are called "domain". Light having passed by the domain will be polarized elliptically, which is a factor causing the image contrast to be greatly lowered.

Figure 7:
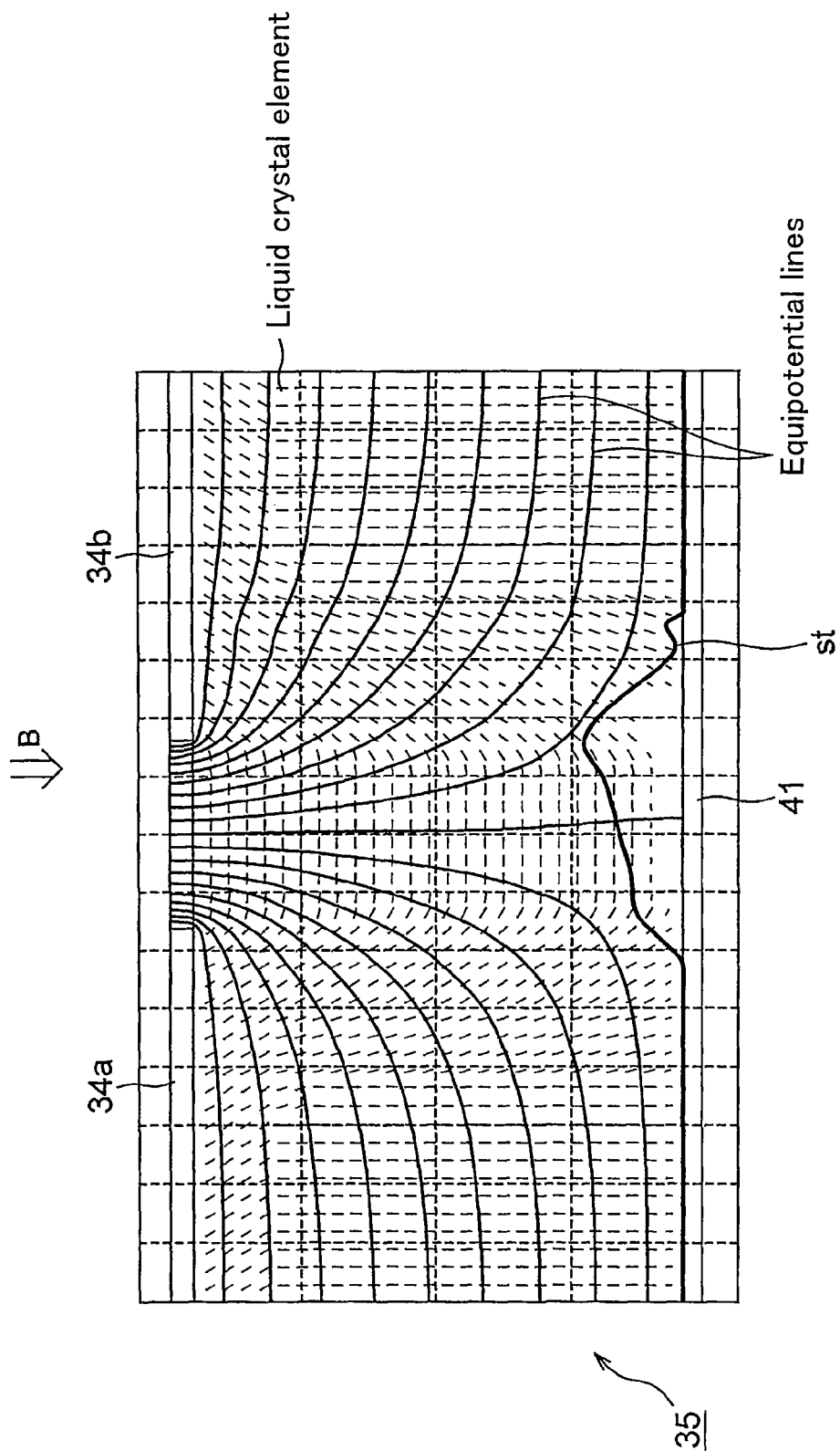
FIG. 7 shows the result of a simulation of the alignment dependence of liquid crystal molecules in a liquid crystal layer on a domain.

FIG. 7 shows the result of a simulation of the alignment dependence of the liquid crystal molecules in a liquid crystal layer on a domain. In this simulation, calculation was made on the assumption that the pixel electrode 34a has been applied with a voltage of +5V while the pixel electrode 34b has been applied with a voltage of −5V and that an opposite electrode 41 opposite to these pixel electrodes 34 with the liquid crystal layer 35 laid between them has been applied with a voltage of +7.5 V.

As shown in FIG. 7, the liquid crystal molecules in the liquid crystal layer 35 are aligned for their major axis to extend along the electric field. Also, in an area between the pixel electrodes 34a and 34b, the liquid crystal molecules are misaligned due to occurrence of the domain.

Figure 8:
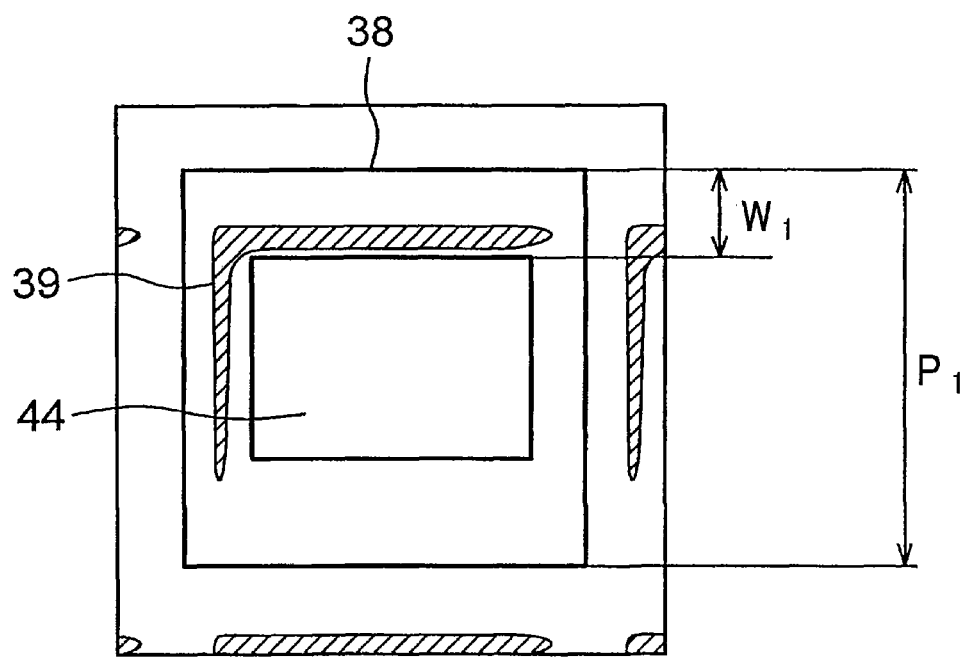
FIG. 8 is a plan view showing the occurrence of the domain.

In FIG. 7, the intensity St of transmitted light indicates the intensity of light passing by the outgoing-side polarizing plate 61 when light having an extreme angle of 0 deg. is incident upon the liquid crystal display 3 laid between the incident-side polarizing plate 59 and outgoing-side polarizing plate 61. Since light passing by the misaligned liquid crystal molecules includes an elliptically polarized component, it will pass by an outgoing-side polarizing plate (not shown). Thus, the intensity St of light passing by an area where the domain has occurred will be larger. FIG. 8 shows a two-dimensional view from the arrow B in FIG. 7 of how the domain takes place. As shown, domains 39 take place on and around the black matrix 38. The domains 39 take place in different positions depending upon the rubbing direction or the like. They take place around a pixel opening region 44 corresponding in size to the pixel electrode 34. It should be noted that in this simulation, the pixel pitch $P_1$ was 16 μm and the ratio in area of the pixel opening region 44 to one pixel (will be referred to as "TFT opening ratio" hereunder) was 60%. As shown, a domain takes place in a range $W_1$ of about 3.5 μm from the end of the pixel, as shown in FIG. 6.

Of the visibility angle of the liquid crystal and light leakage through domain, as the causes of lowering the image contrast, the former can be improved because the phase difference of the liquid crystal layer 35 can be compensated by disposing the optical compensation element 60. Thus, it will be known that the light leakage through domain will be a factor upon which the lower image contrast depends in case the liquid crystal display 3 is provided in the liquid crystal projector 1 having the optical compensation element 60 provided therein as in this embodiment. On this account, in case the liquid crystal projector 1 has both the optical compensation element 60 and liquid crystal display 3 provided therein, the contrast can further be improved by reducing the incident light upon the domain through optimization of the micro lens design value.

According to this embodiment, the shape of the micro lens array 11 and the like are optimized as follows to improve the contrast on the assumption that the micro lens array is to be provided in the liquid crystal projector 1 having the optical compensation element 60 provided therein.

Figure 9:
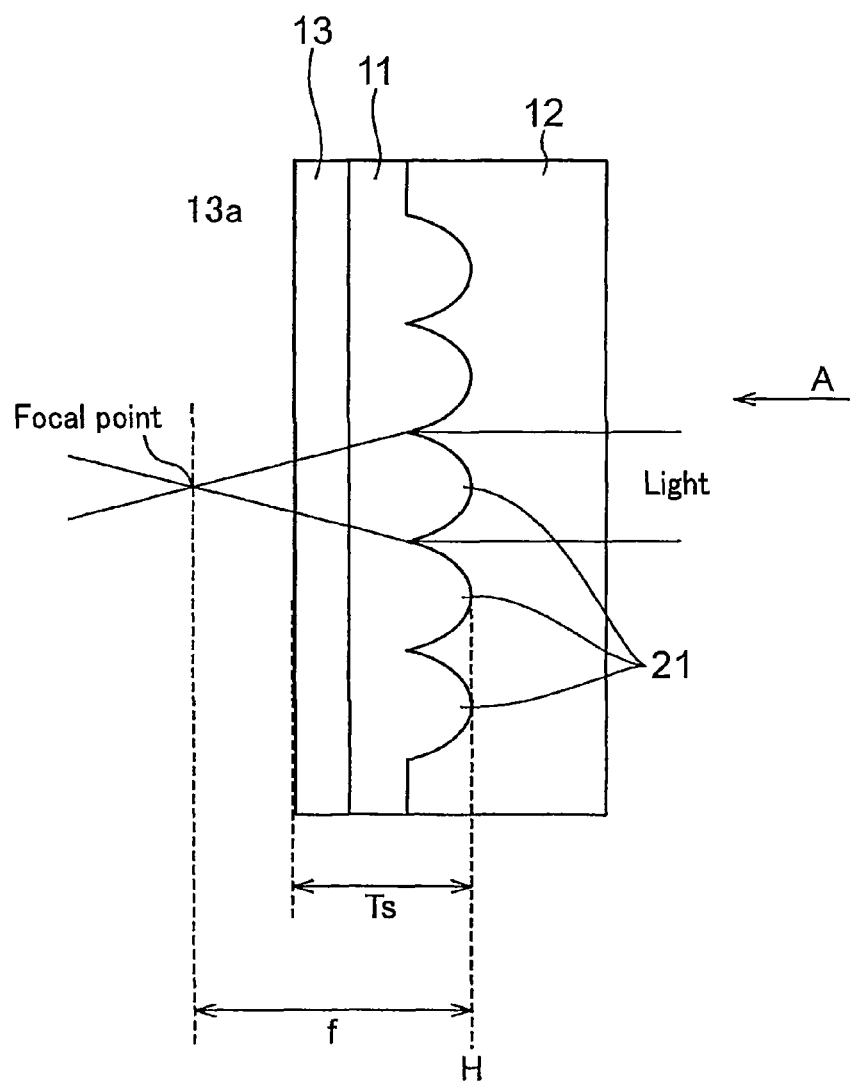
FIG. 9 explains parameters used in designing the micro lenses.

In designing the micro lens 21, it is generally necessary to determine mainly two parameters, namely, a focal distance f and cover surface layer thickness Ts. The cover surface layer thickness Ts is a thickness measured between the main surface H of the micro lens 21 and condensing-side surface 13a of the cover glass 13. The main surface H corresponds to the apex of the micro lens 21 as shown in FIG. 9 as the case may be.

The focal distance f is given by the following equation (1):

$$f = r/\Delta n \quad (1)$$

where r is a radius of curvature of the lens surface and $\Delta n$ is a difference in refractive index between the micro lens array 11 and glass substrate 12.

By determining the two parameters, namely, such a focal distance and cover surface layer thickness Ts, it is possible to freely control the angle and beam density of light L passing by the micro lens array 11.

Concerning the micro lens array 11 according to this embodiment, these parameters are determined as follows:

First, occurrence of a domain in the liquid crystal layer 35 is simulated as shown in FIGS. 7 and 8.

Next, a light intensity distribution in the pixel opening region 44 is determined by making a light tracking simulation in the optical system of the liquid crystal projector 1 including the liquid crystal layer 35. Namely, a design value of the micro lenses 21 included in the micro lens array 11 is optimized based on the result of the light tracking for no light to enter an area W1 (range of about 3.5 μm from the pixel end in an example shown in FIG. 8) having been determined by the domain-occurrence simulation.

Figure 10:
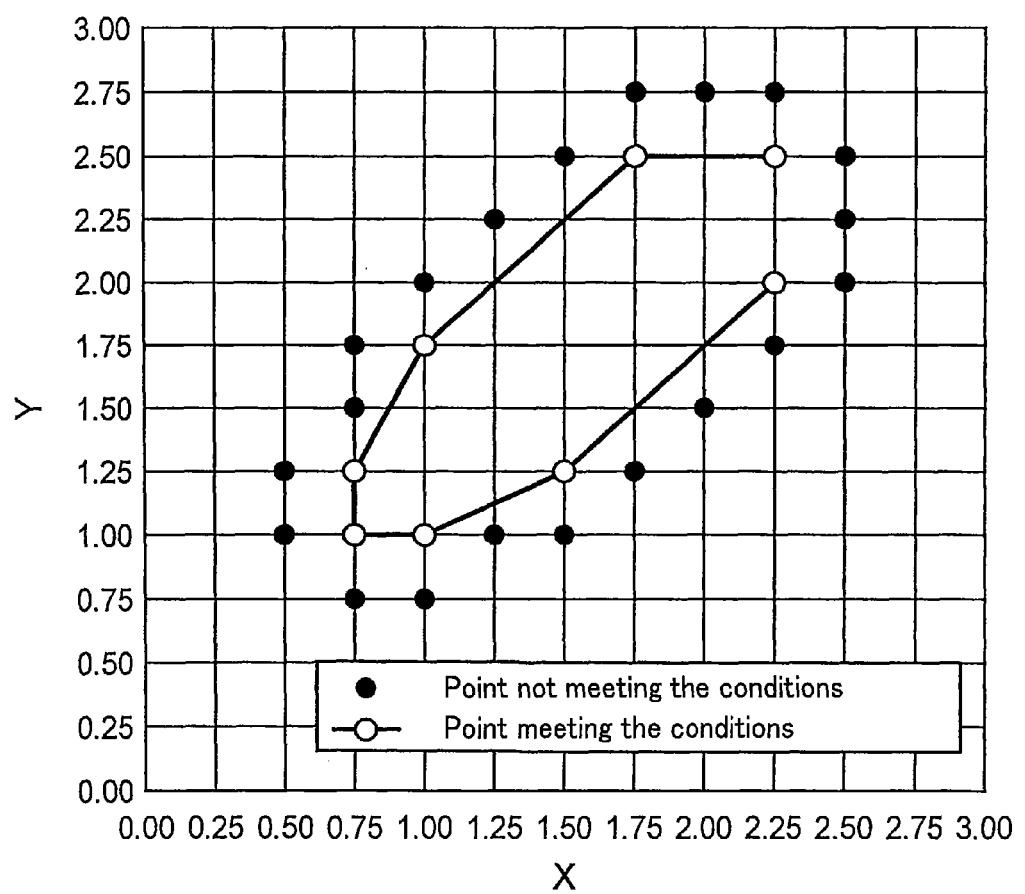
FIG. 10 shows the result of a light tracking simulation with a matrix formed from points X and Y disposed with a pitch of 0.25.

FIG. 10 shows the result of a light tracking simulation of the focal distance f of the micro lenses 21 and cover surface layer thickness Ts with a matrix formed from points X and Y in the following equation (2) disposed with a pitch of 0.25 in case the pixel pitch $PP_1$ (pitch of the micro lenses) is 16 μm and area where the domain takes place is 3.5 μm off the pixel end:

$$X = Ts/\sqrt{2}P, Y = f/\sqrt{2}P \quad (2)$$

In the X-Y coordinate system shown in FIG. 10, each small white circle indicates a point that meets a requirement that no light should be incident upon the area where the domain takes place and each small black circle indicates a point that does not meet the requirement. As the result of the above optimization, in case the coordinate (X, Y) is within an area surrounded by the following point sets in the X-Y coordinate system, the requirement will be met and hence no light will be incident upon the area where the domain takes place:

(0.75, 1.00), (0.75, 1.25), (1.00, 1.75), (1.75, 2.50), (2.25, 2.50), (2.25, 2.00), (1.50, 1.25), (1.00, 1.00).

It will be known that the micro lens array 11 formed from the micro lenses 21 designed under the above conditions is shorter in focal length than the design value of the micro lens array disclosed in the previously mentioned Japanese Patent Laid Open No. 86901 of 1996. Generally, as the focal length is shorter, the micro lens will shape a beam having a thinner waist, thereby improving the image contrast.

Also, the smaller the pixel pitch P, the greater the influence of the domain becomes. So, the effect of the present invention will be larger. The smaller the pixel pitch P, the larger the proportion of the area where the domain takes place becomes, which is more outstanding with a pixel pitch P being less than 14 μm as proved by the result of the light tracking simulation. It should be noted that when the distance k from the pixel end of the area where the domain takes place is within a range of ⅓ to ⅕ of the pixel pitch P, the present invention will be more effective.

Since the focal distance f of the micro lens 21 and cover surface layer thickness Ts are optimized based on the aforementioned equation (2), the micro lens array 11 according to this embodiment can reduce light incident upon the domain and thus limit the image contrast from being lowered due to the light leakage through the domain.

Especially, by disposing the micro lens array 11 in the liquid crystal projector 1 having the optical compensation element 60 provided therein as in this embodiment, it is possible to limit the contrast from being lowered to the visibility angle of the liquid crystal as well as due to the light leakage through the domain, and thus provide a high-contrast, sharp image.

In the projector used primarily for presentation in a conference or the like, major consideration has heretofore been given to the image brightness, not to the image contrast. On the other hand, in the projector for movie viewing, it has been strongly demanded to improve the contrast for a sharp image as well as the image brightness. According to the present invention, it is possible to implement both the high brightness and contrast. For example, the liquid crystal projector 1 according to the present invention can be used to view a movie even in a bright room, and thus can be differentiated as a home projector.

For information, the focal distance f of the micro lens 21 can be adjusted by changing the radius of curvature with a technique such as etching or by changing the difference in refractive index between the micro lens 21 and glass substrate 12. The embodiment may adopt any one of these techniques for adjustment of the focal distance f. The lens surface of the micro lens 21 is rotation-symmetrical and can be defined by the following equation (3) on the basis of a three-dimensional coordinate system (x, y, z) in which z indicates a plane parallel to the optical axis:

$$Z = \frac{Cr^2}{1 + \sqrt{1 - (k+1)C^2 r^2}} \quad (3)$$

where C is a curvature (=1/radius of curvature) of the micro lens 21, k is an aspheric constant and r indicates a coordinate from the center of the micro lens 21.

Note that in case the difference in refractive index between the micro lens 21 and glass substrate 12 is 0.2 or more, the micro lens 21 can desirably be formed more easily. Also, the aspheric constant k may also be included in the parameters of the micro lens 21. The micro lens 21 is spherical when the aspheric constant k is zero. In this case, the degree of freedom of the radius of curvature will be lower. Therefore, the aspheric constant k of the micro lens 21 should desirably be other than zero. In other words, the micro lens 21 should desirably be formed from an aspheric lens.

The liquid crystal display 3 of the transmissive type has been described as an example in the foregoing. However, the present invention is not limited to such a liquid crystal display, but it is effectively applicable to a liquid crystal display of a reflection type.

Next, there will be explained in detail an embodiment of the liquid crystal projector 1 according to the present invention.

Figure 11A:
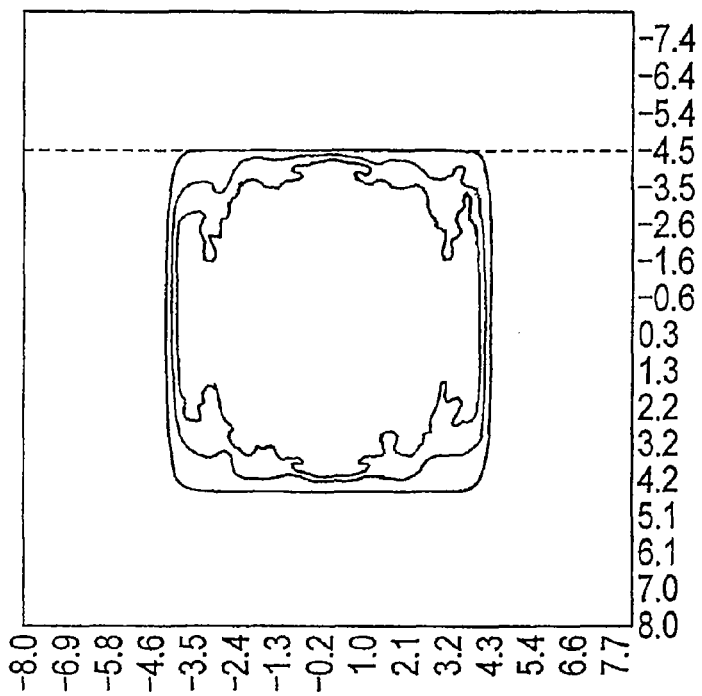
FIGS. 11A and 11B show the result of a simulation of light intensity distribution in one pixel when the liquid crystal display having the micro lens array disposed therein is provided in the liquid crystal projector.

FIG. 11A shows the result of a simulation of light intensity distribution in one pixel when the liquid crystal display 3 having the micro lens array 11 designed as above disposed therein is provided in the liquid crystal projector 1 according the present invention.

The simulating is effected under the following conditions:

| | |
|---|---|
| Light wavelength | 550 nm |
| Max. extreme angle of incident light upon the liquid crystal display 3 | 9 deg. |
| Pixel pitch in the liquid crystal display | 16 μm |
| Ratio of open area in TFT | 60% |
| Focal distance f | 34.0 μm |
| Cover surface layer thickness | 22.6 μm |

The micro lens array 11, glass substrate 12 and cover glass 13 are configured as shown in FIG. 6A. The micro lens array 11 is formed by the well-known photolithography. The glass substrate 12 is formed from quartz (1.46 in refractive index). The micro lens array 11 is formed from a resin having a refractive index of 1.70.

Figure 11B:
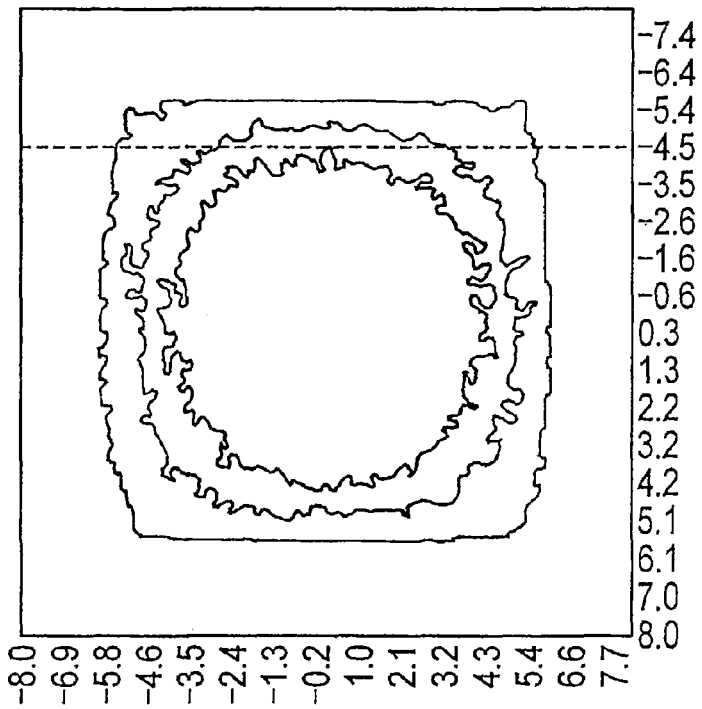

In addition, FIG. 11B shows the result of comparison in light intensity distribution in a pixel between the micro lens 21 and a conventional micro lens of which the focal distance f is 34.0 μm and cover surface layer thickness is 22.6 μm.

In the liquid crystal display 3 according to the present invention, no light is incident upon an area $W_1$ where a domain takes place (3.5 μm or less from the pixel end) as the result of a simulation as shown in FIG. 11A.

Figure 12:
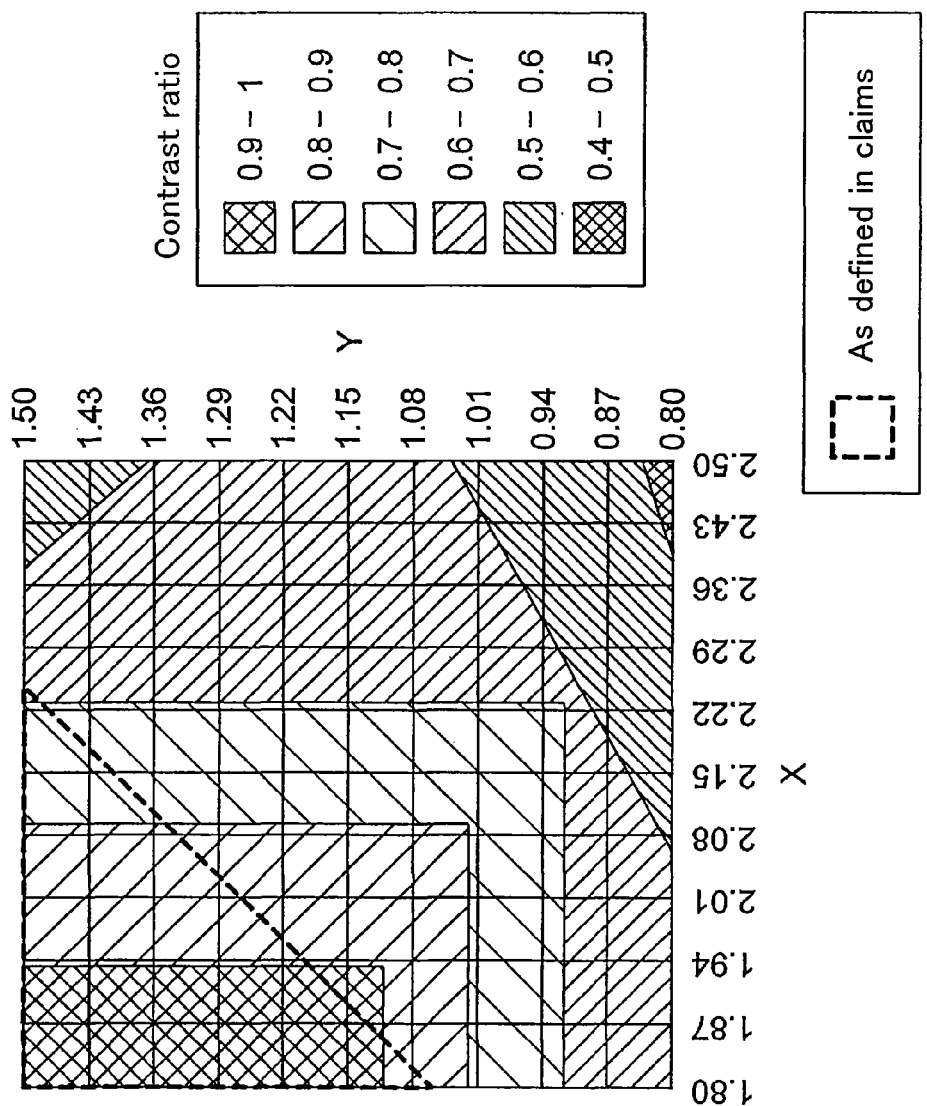
FIG. 12 shows the result of a measured-contrast simulation.

FIG. 12 shows the result of a measured-contrast simulation made when the liquid crystal projector 1 according to the present invention has disposed therein the liquid crystal display 3 having provided therein micro lenses 21 having the following design values assigned thereto.

The conditions employed for the measure-contrast simulation are as follows:
 Max. extreme angle of light incident upon the liquid crystal display 3 9 deg.
 F value of the projection lens 79 1.5
 Pixel pitch P in the liquid crystal display 13 μm
The micro lens array 11, glass substrate 12 and cover glass 13 are configured as shown in FIG. 6A. The micro lens array 11 is formed by the well-known photolithography. The glass substrate 12 is formed from quartz (1.46 in refractive index). The micro lens array 11 is formed from a resin having a refractive index of 1.70. The micro lens 21 was experimentally produced under conditions of X being 1.8 to 2.5 and Y being 0.8 to 1.5.

In the liquid crystal display 3 according to the present invention, the contrast is high in an area meeting the aforementioned equation (2) as shown in FIG. 12.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A micro lens array in which a plurality of micro lenses, each formed from an aspheric lens, is disposed two-dimensionally on a substrate, wherein for each micro lens, the focal distance f of the micro lens and distance Ts from a main surface of the micro lens to a substrate surface upon which light is incident meet the following relationships:

$$X = Ts/\sqrt{2}P$$

$$Y = f/\sqrt{2}P$$

where P is a pitch of the micro lenses and is X and Y are within an X-Y coordinate system surrounded by point sets (0.75, 1.00), (0.75, 1.25), (1.00, 1.75), (1.75, 2.50), (2.25, 2.50), (2.25, 2.00), (1.50, 1.25), (1.00, 1.00) so that a distance k from the end of an area where a domain takes place is within a range of ⅓ to ⅕ of the pitch P so that no light will enter the domain-occurring area.

2. The micro lens array according to claim 1, wherein the micro lenses are disposed with a pitch of 14 μm or less.

3. The micro lens array according to claim 1, wherein each micro lens has a difference in refractive index of 0.2 from the substrate.

4. A liquid crystal display comprising:
 a pixel substrate having formed thereon pixel electrodes to which a signal voltage corresponding to image data is applied;
 a substrate having opposite electrodes disposed opposite to the pixel electrodes with a liquid crystal layer laid between the opposite and pixel electrodes; and
 a micro lens array in which a plurality of micro lenses, each formed from an aspheric lens, is disposed two-dimensionally on the opposite substrate;
 the focal distance f of micro lens and distance Ts from a main surface of the micro lens to the a substrate surface upon which light is incident meeting the relationships $$X = Ts/\sqrt{2}P$$

$$Y = f/\sqrt{2}P$$

where P is a pitch of the micro lenses and is X and Y are within an X-Y coordinate system surrounded by point sets (0.75, 1.00), (0.75, 1.25), (1.00, 1.75), (1.75, 2.50), (2.25, 2.50), (2.25, 2.00), (1.50, 1.25), (1.00, 1.00) so that a distance k from the end of an area where a domain takes place is within a range of ⅓ to ⅕ of the pitch P so that no light will enter the domain-occurring area.

5. The liquid crystal display according to claim 4, wherein the micro lenses are disposed with a pitch of 14 μm or less.

6. The liquid crystal display according to claim 5, wherein each micro lens has a difference in refractive index of 0.2 from the substrate.

7. A projection type display comprising:
 a light source;
 a lighting optical system to focus a light beam emitted from the light source onto a predetermined light path;
 a liquid crystal panel to make optical modulation of the light beam focused by the lighting optical system; and
 a projection lens to project, in a larger scale, the light beam subjected to the optical modulation by liquid crystal elements;

the lighting optical system including a micro lens array in which a plurality of micro lenses, each formed from an aspheric lens, is disposed two-dimensionally on a substrate, and the focal distance f of the micro lens and distance Ts from a main surface of the micro lens to a substrate surface upon which light is incident meeting the relationships $X = Ts/\sqrt{2}P$ $Y = f/\sqrt{2}P$ where P is a pitch of the micro lenses and X and Y are within an X-Y coordinate system surrounded by point sets (0.75, 1.00), (0.75, 1.25), (1.00, 1.75), (1.75, 2.50), (2.25, 2.50), (2.25, 2.00), (1.50, 1.25), (1.00, 1.00) so that a distance k from the end of an area where a domain takes place is within a range of ⅓ to ⅕ of the pitch P so that no light will enter the domain-occurring area.

8. The projection type display according to claim 7, wherein the micro lenses are disposed with a pitch of 14 μm or less.

9. The projection type display according to claim 7, wherein each micro lens has a difference in refractive index of 0.2 from the substrate.

10. The projection type display according to claim 7, further comprising:

first and second polarizing plates disposed at the incident- and outgoing-sides, respectively, of the liquid crystal element;

a polarization controlling means for controlling the first polarizing plate to allow a first polarized component of a light beam condensed by the lighting optical system to pass by for guidance to the liquid crystal element while controlling the second polarizing plate to allow a second polarized component of a light beam coming from the liquid crystal element to pass by for guidance to the projection lens; and a phase difference compensating means disposed between the second polarizing plate and liquid crystal panel and including an optical anisotropic element provided to adjust the phase difference of the light beam.

* * * * *